No. 762,800. PATENTED JUNE 14, 1904.
S. B. BOWDEN.
MEASURING DEVICE.
APPLICATION FILED OCT. 28, 1902.
NO MODEL. 3 SHEETS—SHEET 1.
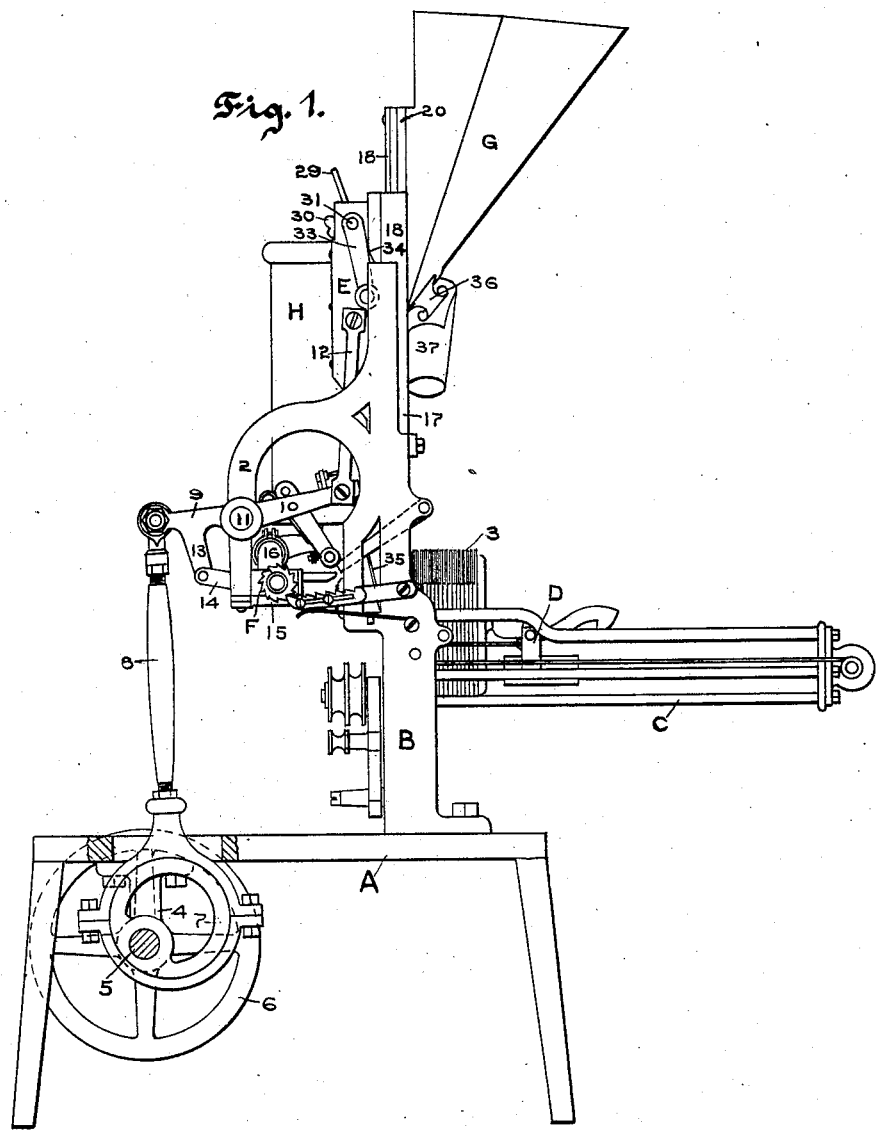
Witnesses,
W. H. Palmer
Emily F. Otis
Inventor,
Sumner B. Bowden.
by Lothrop & Johnson
his Attorneys.

No. 762,800. PATENTED JUNE 14, 1904.
S. B. BOWDEN.
MEASURING DEVICE.
APPLICATION FILED OCT. 28, 1902.
NO MODEL. 3 SHEETS—SHEET 2.

Witnesses,
W. H. Palmer.
Emily F. Otis.

Inventor,
Sumner B. Bowden.
by Lothrop & Johnson
his Attorneys.

No. 762,800. PATENTED JUNE 14, 1904.
S. B. BOWDEN.
MEASURING DEVICE.
APPLICATION FILED OCT. 28, 1902.
NO MODEL. 3 SHEETS—SHEET 3.
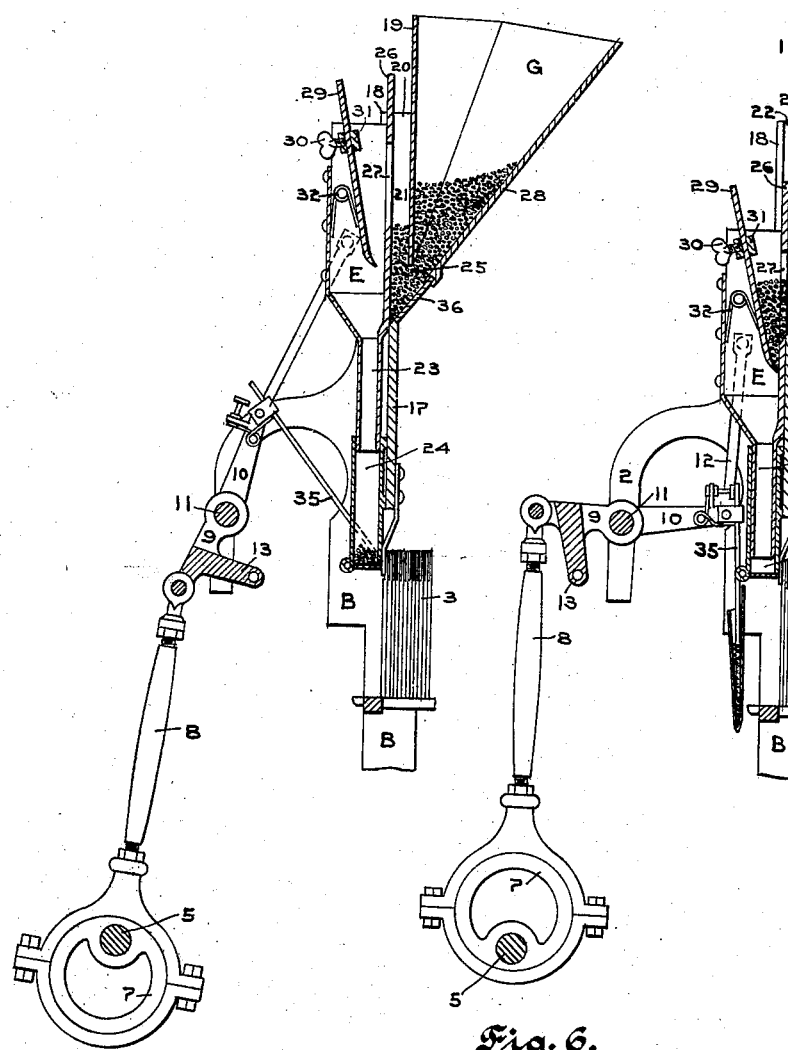
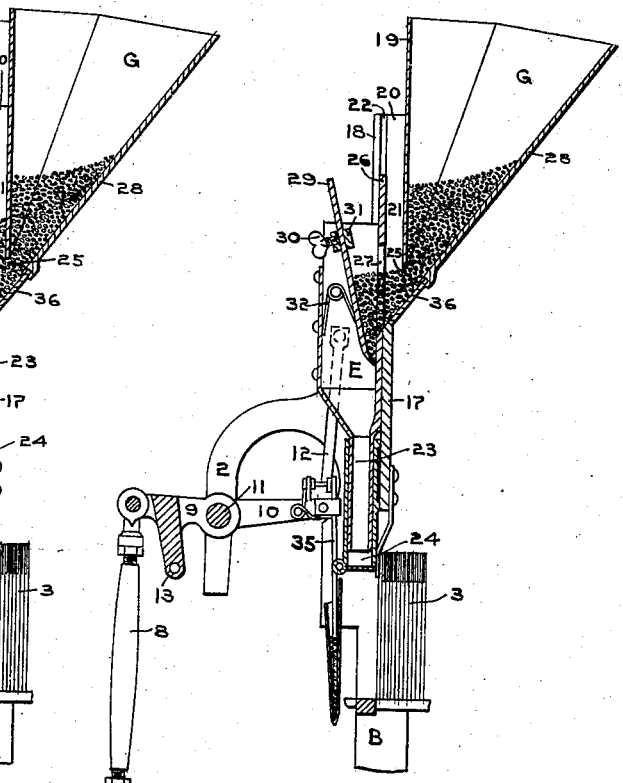
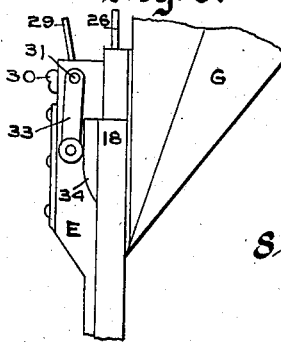
Witnesses,
W. H. Palmer
Emily F. Otis
Inventor,
Sumner B. Bowden.
by Lothrop & Johnson
his Attorneys.

No. 762,800.

Patented June 14, 1904.

UNITED STATES PATENT OFFICE.

SUMNER B. BOWDEN, OF MINNEAPOLIS, MINNESOTA, ASSIGNOR, BY DIRECT AND MESNE ASSIGNMENTS, TO THE AMERICAN BAG FILLING MACHINE COMPANY, OF ST. PAUL, MINNESOTA, A CORPORATION OF MINNESOTA.

MEASURING DEVICE.

SPECIFICATION forming part of Letters Patent No. 762,800, dated June 14, 1904.

Original application filed July 13, 1899, Serial No. 723,666. Divided and this application filed October 28, 1902. Serial No. 129,066.

(No model.)

*To all whom it may concern:*

Be it known that I, SUMNER B. BOWDEN, a citizen of the United States, residing at Minneapolis, in the county of Hennepin and State of Minnesota, have invented certain new and useful Improvements in Measuring Devices, of which the following is a specification.

My invention relates to improvements in measuring devices for seeds and the like, and is particularly adapted for use in connection with machines for filling bags with a predetermined quantity of seeds.

The object of the invention is to provide a device for automatically measuring the amount of seeds in such a way as to avoid bruising or cutting them and to facilitate their discharge into the bag or other receptacle to be filled.

To this end the invention consists in the construction, combination, and arrangement of parts hereinafter described and claimed.

In my application for patent upon bag-filling machine, filed July 13, 1899, Serial No. 723,666, of which the present application is a division, I have shown and described the improved seed-measuring device which is the subject of this application in connection with a machine for filling paper bags with seeds. As in that application the construction and operation of the bag-filling machine is fully set forth, I shall in this divisional application limit the description and drawings to the measuring devices themselves and the parts closely coöperating therewith.

Figure 3:
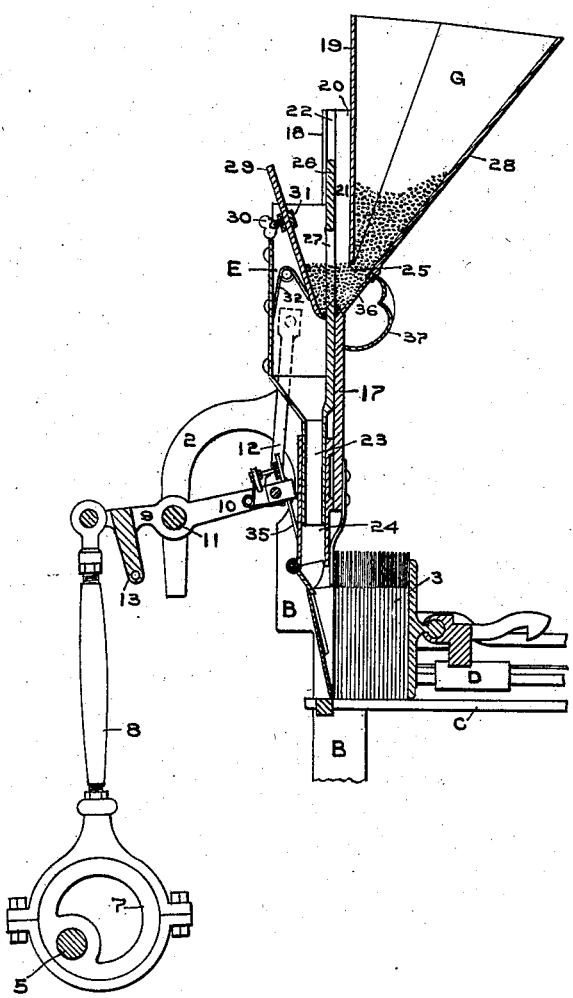
Figure 2:
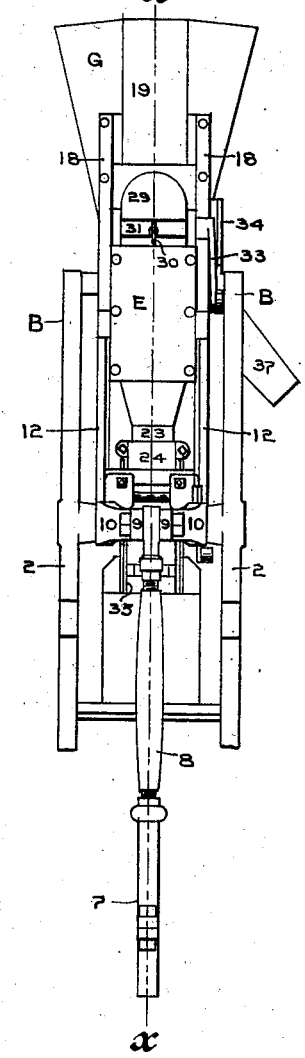

In the accompanying drawings, forming part of this specification, Figure 1 is a side elevation of the improved measuring device in place upon a bag-filling machine with the mechanism for carrying away the filled bags omitted for the sake of clearness. Fig. 2 is a front end elevation of the improved measuring device, showing so much of the bag-filling machine as is necessary for understanding the operation of the device. Fig. 3 is a vertical section taken on line $x$ $x$ of Fig. 2, showing the measuring-magazine in descending position and receiving seeds from the hopper with the seed-outlet closed. Fig. 4 is a similar section, showing the measuring-magazine at the limit of its downward travel and in seed-receiving position with the seed-outlet closed. Fig. 5 is a similar section, but showing the measuring-magazine at the limit of its upward travel with the seed-outlet open, the measured seeds discharged, and the further supply of seeds from the hopper cut off; and Fig. 6 is a detail showing the trip mechanism for automatically opening the seed-outlet of the magazine.

In the drawings the bag-filling machine comprises a frame A, having upwardly-extending standards B, formed with forwardly and downwardly projecting arms 2.

C is a framework or receptacle for holding a row of bags 3 to be filled. This receptacle is mounted transversely upon the standards B and extends rearwardly therefrom. The bags are pressed forward in the receptacle by means of a bag-pushing carriage D, working longitudinally in the frame C and kept normally in pressing position against the row of bags in the manner fully described in my application hereinbefore referred to, of which this application is a division.

Journaled in suitable bearings 4 upon the under side of the framework A is the main shaft 5, driven through the medium of the drive-pulley 6 from any suitable source of power. Upon this shaft is mounted an eccentric 7, carrying an eccentric-rod 8, to the upper end of which is pivoted a rearwardly-extending stirrup-shaped lever 9 with bifurcated arms 10. This lever is fulcrumed upon the rod 11, which has fixed support in the arms 2. The free ends of the lever-arms 10 are pivotally connected by links 12 with the seed-measuring magazine E. Between its fulcrum-support and its pivotal connection with the eccentric-rod this lever is formed with a downwardly-projecting arm 13, pivotally connected by the link 14 with the gumming-box or paster F, which is slidably supported upon the guide 15 and adapted to receive gum from the reservoir H through the tube 16. As the construction of the gumming-box and the mechanism for operating it and supplying it with gum are fully described in the application of which this is divisional and form no part of the invention which is the subject of this application, further description of these devices is unnecessary.

To the standards B, above the bag-receptacle C, is secured a plate 17, terminating in upwardly-projecting columns 18. To the top of this plate and to the columns is secured the seed-hopper G. The face or front wall 19 of the hopper is set off from the columns by walls or flanges 20, which may be either upon the back of the columns or the face of the hopper, to form a space or pocket 21 between the face of the hopper and the receptacle E for a purpose hereinafter to be explained. This receptacle E, which may be called the "measuring-magazine," since by its construction and operation it determines the amount of seeds to be conveyed to the bag to be filled, is arranged to slide up and down in front of the hopper in guides 22 upon the face of the plate 17 and its columns 18 when actuated by the lever-arms 10 and connecting-links 12. The bottom of the magazine terminates in a tube 23, which projects down within a funnel 24, secured to the plate 17. The face of the hopper is formed at the bottom with an opening 25 just above the top of the plate 17, and the adjacent wall 26 of the measuring-magazine is likewise formed with an opening 27 to allow the seeds to pass from the hopper into the measuring-magazine. The better to facilitate the passage of the seeds, the rear wall 28 of the hopper is preferably made sloping, and the top of the plate 17, and the top of that part of the adjacent wall 26 of the measuring-magazine which is below the opening 27, which may be called the "cut-off" wall portion, are beveled or cut away downwardly toward the measuring-magazine, so that when the measuring-magazine is in its lowermost position, as shown in Fig. 4, the beveled top of the plates form practically a continuation of the sloping rear wall of the hopper.

Within the measuring-magazine and extending from side to side across it is a partition 29, removably and adjustably secured by means of a set-screw 30 to a rod 31, which has pivotal support in the sides of the magazine. The lower end of the partition is held normally pressed into contact with the cut-off portion of the rear wall 26 of the magazine below the opening 27 by means of a spring 32. Secured to the rod 31 on the outside of the measuring-magazine is a downwardly-depending trigger 33, which as the measuring-magazine moves upward in its travel is engaged by the cam or trip 34 upon the column 18, as shown in Fig. 6, to turn the rod 31, and the partition 29 carried thereby against the pressure of the spring 32, whereby the lower end of the partition is forced away from the rear wall of the magazine, thus opening the pocket formed by the partition to allow the contained seeds to drop into the funnel 24 below.

In the drawings I have shown fingers 35 secured to the outer ends of the lever-arms 10 and operated by means of the lever to enter and be withdrawn from the bags to be filled; but as the construction and operation of these fingers are fully described in the application of which this is a division and as these fingers form no part of the seed-measuring device here shown and do not necessarily coöperate with it it is not necessary further to describe them.

When the measuring-magazine is in its lowermost position, as shown in Fig. 4, with the bottom of the partition 29 held in closed position against the rear wall of the magazine, the openings in the face of the hopper and in the rear wall of the magazine register, and a quantity of the seeds or other material contained in the hopper passes through these openings to the space or pocket above the partition, filling this space, as well as the space 21 between the rear wall of the measuring-magazine and the face of the hopper, nearly or quite up to the level of the top of the opening in the hopper. As the measuring-magazine, actuated by the eccentric 7, through the medium of the eccentric-rod 8, the lever 9, and the links 12, moves on its upward travel the supply of seeds is cut off by the upward movement of the cut-off portion of the wall 26 of the magazine below the opening 27 therein. As this cut-off portion of the wall passes up through the seeds the overload of seeds above the beveled edge of the wall will drop back by gravity into the space 21 between the face of the hopper and the adjacent wall of the magazine, leaving within the partition the exact measure of seeds required for filling one of the bags. Just before the magazine reaches its uppermost position, as shown in Fig. 5, the bottom of the partition is opened by the trip means hereinbefore described and the contained seeds drop into the funnel 24 below. As the measuring-magazine again descends sufficiently to bring the end of the trigger 33 below the cam 34 the partition is again thrown back by the spring 32 against the wall of the magazine in readiness to receive another supply of seeds.

The partition 29 can be readily adjusted in height by means of the thumb-screw 30, according to the quantity of seeds it is desired to measure out. The bottom of the hopper is preferably provided with a sliding gate 36 and a chute 37 for the removal of seeds from the hopper when it is desired to empty the same without filling the bags.

By providing a measuring-magazine having the upper part of its side wall open and working up and down before a hopper set off from the magazine by a space or pocket into which the hopper opens and through which the seeds pass all cutting or bruising of the seeds or jamming of them between moving parts is obviated, for the upper end of the cut-off portion of the magazine-wall does not force the seeds against any hard substance, but merely moves up through their midst, at once cutting off the further supply and allowing all seeds except the measured quantity to fall back by gravity from the magazine into the space 21.

It will be understood that the word "seeds" as used in the specification and claims is intended to include material of any sort adapted to be measured by my improved device.

I do not limit myself to the exact details of the mechanism shown and described, for the same can be variously modified without departing from the principle of the invention, the scope of which is defined in the claims.

Having now described my invention, what I claim as new, and desire to secure by Letters Patent, is—

1. A measuring device of the class described, comprising, in combination, a hopper, a vertically-reciprocating measuring-magazine slidably arranged against the hopper, a measuring-partition within the magazine and means to adjust the same, intercommunicating openings in the adjacent walls of the hopper and measuring-magazine, means for keeping the lower end of the partition normally in contact with the rear wall of the magazine for the reception of material, and means for automatically turning the partition out of such contact for the discharge of material.

2. A measuring device of the class described, comprising, in combination, a hopper, a reciprocating measuring-magazine slidably arranged adjacent to the hopper, the hopper and measuring-magazine having intercommunicating openings in their adjacent walls, an adjustable measuring-partition within the magazine, spring means for keeping the partition normally in contact with the rear wall of the magazine, and a trip for automatically retracting the same against the spring-pressure, for the purpose set forth.

3. A measuring device of the class described, comprising, in combination, a hopper, a substantially vertically-reciprocating measuring-magazine working in guides upon the face of the hopper, the hopper and measuring-magazine having intercommunicating openings in their adjacent walls, a measuring-partition within the magazine, spring means for keeping the lower end of the partition normally in contact with the rear wall of the magazine, and a trip for automatically turning the partition out of such contact, for the purpose set forth.

4. A measuring device of the class described, comprising, in combination, a hopper, a measuring-magazine arranged to slide upon the face of the hopper, the hopper and measuring-magazine having intercommunicating openings in their adjacent walls, an adjustable measuring-partition within the magazine and pivotally mounted in the sides thereof, means for keeping the lower end of the partition normally in contact with the rear wall of the magazine and below the opening therein, and means for automatically turning the partition for the discharge of material.

5. A measuring device of the class described, comprising, in combination, a hopper and a vertically-reciprocating measuring-magazine arranged adjacent to the hopper but set off therefrom to form a pocket positioned between the hopper and the measuring-magazine, the hopper having an opening leading to the pocket for the supply of material thereto, and the measuring-magazine having a cut-off wall portion adjacent to the pocket and being open, above the cut-off wall portion, to communication with the pocket, whereby the material to be measured passes from the pocket to the measuring-magazine during the downward travel of the magazine and any overload of material passes back to the pocket during the upward travel of the magazine.

6. A measuring device of the class described, comprising, in combination, a hopper, a vertically-reciprocating measuring-magazine, and a pocket disposed between the adjacent walls of the hopper and the magazine, the hopper having an opening leading to the pocket for the supply thereto of material to be measured, and the adjacent wall of the magazine being cut away at its upper part for communication with the pocket, whereby the material passes from the pocket to the magazine during the downward travel of the magazine, and any overload of material passes back to the pocket during the upward travel of the magazine, the rear wall of the magazine below the cut-away portion being positioned and adapted to pass up through the material in the upward travel of the magazine and cut off the further supply thereof.

7. A measuring device of the class described, comprising, in combination, a vertically-reciprocating measuring-magazine having on one side a cut-off wall portion of less height than the other walls of the magazine, a seed-receptacle adjacent to the cut-off wall portion of the measuring-magazine, the receptacle being closed at the bottom but being open on the side adjacent to the cut-off wall of the magazine to a height above the point reached by the cut-off wall at its upper limit of travel, whereby the seeds will pass into the measuring-magazine during the downward travel thereof, the cut-off wall being positioned and adapted to pass up through the seeds without coming into seed-bruising proximity to the walls of the seed-receptacle, and means for automatically discharging the contents of the measuring-magazine during the upward travel thereof.

In testimony whereof I affix my signature in presence of two witnesses.

SUMNER B. BOWDEN.

Witnesses:
ARTHUR P. LOTHROP,
H. S. JOHNSON.